United States Patent
Mishra et al.

(10) Patent No.: US 11,093,217 B2
(45) Date of Patent: Aug. 17, 2021

(54) SUPERVISED ENVIRONMENT CONTROLLABLE AUTO-GENERATION OF HTML

(71) Applicant: International Business Machines Corporation, Armonk, NY (US)

(72) Inventors: Abhijit Mishra, Bangalore (IN); Enara C Vijil, Westchester, NY (US); Seema Nagar, Bangalore (IN); Kuntal Dey, Vasant Kunj (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/701,463

(22) Filed: Dec. 3, 2019

(65) Prior Publication Data

US 2021/0165636 A1    Jun. 3, 2021

(51) Int. Cl.
G06F 9/44 (2018.01)
G06F 8/30 (2018.01)
G06F 16/951 (2019.01)
G06N 3/08 (2006.01)
G06F 8/60 (2018.01)
(Continued)

(52) U.S. Cl.
CPC .................. *G06F 8/30* (2013.01); *G06F 8/20* (2013.01); *G06F 8/60* (2013.01); *G06F 16/951* (2019.01); *G06N 3/0445* (2013.01); *G06N 3/0454* (2013.01); *G06N 3/088* (2013.01)

(58) Field of Classification Search
None
See application file for complete search history.

(56) References Cited

U.S. PATENT DOCUMENTS 7,216,298 B1    5/2007   Ballard
7,668,905 B2    2/2010   Bernardini
(Continued)

FOREIGN PATENT DOCUMENTS

CN        106055716 A       10/2016

OTHER PUBLICATIONS

"AccessibilityWorks", IBM Research, last updated May 26, 2015, 4 pages, <https://researcher.watson.ibm.com/researcher/view_group.php?id=2201>.

(Continued)

*Primary Examiner* — Insun Kang
(74) *Attorney, Agent, or Firm* — Randy E. Tejeda (57) ABSTRACT

In an approach to generating HTML based on a plurality of content and design controls, one or more computer processors crawl one or more conforming websites. The one or more computer processors create a training set of crawled conforming webpages, wherein each crawled conforming webpage in the training set of crawled conforming webpages includes associated web code labeled a combination of respective one or more content controls and respective one or more design controls; encode the combination of the respective one or more design controls and the respective one or more content controls based on one or more user preferences utilizing a created design encoder and a created content encoder; create a decoder with the training set of crawled conforming webpages and associated encoded content and design vectors; generate web code based on the encoded design and content controls utilizing the created decoder; implement generated web code.

17 Claims, 4 Drawing Sheets

(51) Int. Cl.
*G06N 3/04* (2006.01)
*G06F 8/20* (2018.01)

(56) References Cited

U.S. PATENT DOCUMENTS

| | | | |
|---|---|---|---|
| 7,668,913 B1 | 2/2010 | Underwood | |
| 7,747,941 B2 | 6/2010 | Campbell | |
| 8,909,683 B1* | 12/2014 | Ledet | G06F 16/958 |
| | | | 707/804 |
| 8,949,780 B2 | 2/2015 | McAuley | |
| 9,563,327 B1* | 2/2017 | Pham | G06F 3/04847 |
| 2002/0054084 A1* | 5/2002 | Udell | G06F 16/957 |
| | | | 715/738 |
| 2002/0188633 A1 | 12/2002 | Davis | |
| 2008/0313260 A1 | 12/2008 | Sweet | |
| 2009/0119329 A1* | 5/2009 | Kwon | G06F 16/957 |
| 2009/0265368 A1 | 10/2009 | Crider | |
| 2015/0106692 A1* | 4/2015 | Bolchini | G06F 3/0487 |
| | | | 715/234 |
| 2017/0039577 A1* | 2/2017 | Gauthier | G06Q 30/0201 |
| 2017/0192983 A1* | 7/2017 | Weng | G06F 16/958 |
| 2017/0262164 A1* | 9/2017 | Jain | G06F 8/38 |
| 2018/0041536 A1* | 2/2018 | Berlin | G06N 3/08 |
| 2018/0164970 A1* | 6/2018 | Volkerink | G06F 9/451 |
| 2018/0253408 A1* | 9/2018 | Severn | G06N 5/04 |
| 2018/0300609 A1* | 10/2018 | Krishnamurthy | G06N 3/0445 |
| 2018/0374108 A1* | 12/2018 | Kannan | G06F 16/958 |
| 2019/0056917 A1* | 2/2019 | Bernal | G06F 8/36 |
| 2019/0121522 A1* | 4/2019 | Davis | G06F 3/04815 |
| 2019/0155945 A1* | 5/2019 | Zhelezniak | G06F 16/3347 |
| 2019/0179879 A1* | 6/2019 | Amiga | H04L 63/00 |
| 2019/0188276 A1* | 6/2019 | Anerousis | G06K 9/6215 |
| 2019/0220490 A1* | 7/2019 | Berk | G06F 40/284 |
| 2019/0227980 A1* | 7/2019 | McMahan | G06N 3/0454 |
| 2019/0236095 A1* | 8/2019 | Achan | G06F 16/9535 |
| 2019/0294642 A1* | 9/2019 | Matlick | G06F 16/958 |
| 2019/0294657 A1* | 9/2019 | Singh | G06F 40/14 |
| 2019/0349439 A1* | 11/2019 | Anders | G06F 16/955 |
| 2019/0354584 A1* | 11/2019 | Wallenfelt | G06F 40/216 |
| 2019/0369969 A1* | 12/2019 | Donohoe | G06F 9/455 |
| 2019/0370350 A1* | 12/2019 | Chung | G06F 16/9574 |
| 2020/0028753 A1* | 1/2020 | Powar | G06Q 20/32 |
| 2020/0036799 A1* | 1/2020 | Weissblum | H04L 63/306 |
| 2020/0042560 A1* | 2/2020 | Berk | G06F 16/2455 |
| 2020/0074006 A1* | 3/2020 | Ram | H04L 67/306 |
| 2020/0104395 A1* | 4/2020 | Bhatia | G06N 3/0472 |
| 2020/0106850 A1* | 4/2020 | Popowitz | H04L 67/2823 |
| 2020/0210511 A1* | 7/2020 | Korobov | G06F 16/951 |
| 2020/0233924 A1* | 7/2020 | George | G06F 16/958 |
| 2020/0250259 A1* | 8/2020 | Nanavati | G06F 8/65 |
| 2020/0250583 A1* | 8/2020 | Hammond | G06F 8/311 |
| 2020/0279022 A1* | 9/2020 | Dvorkovich | G06F 40/58 |
| 2020/0311350 A1* | 10/2020 | Makino | G06F 40/216 |
| 2020/0320163 A1* | 10/2020 | Raiskin | G06N 3/08 |
| 2020/0344195 A1* | 10/2020 | Jang | H04M 1/72569 |

OTHER PUBLICATIONS

"GPII Architecture Overview", From wiki.gpii, This page was last modified on Aug. 23, 2017, at 18:29, 27 pages, <https://wiki.gpii.net/w/GPII_Architecture_Overview>.
"IBM AbilityLab Content Clarifier", Printed Nov. 26, 2019, 4 pages, <https://www.ibm.com/able/content-clarifier.html>.
"OpenAPE" REMEX, © Hochschule der Medien / Stuttgart Media University 2017, 1 page, <https://openape.gpii.eu/index>.
"SUPPLE: Automatically Generating Personalized User Interfaces", last modified on Apr. 4, 2010, 4 pages, <http://www.eecs.harvard.edu/~kgajos/research/supple/>.
"Website Accessibility Solutions", AudioEye, Copyright 2019 AudioEye, Inc., 8 pages, <https://www.audioeye.com/website-accessibility/>.
Garrigos et al."A Structured Approach to Personalize Websites Using the OO-H Personalization Framework", Printed Nov. 26, 2019, 12 pages.
Garrigos et al., "Modeling User Behaviour Aware WebSites with PRML", Printed Nov. 26, 2019, 15 pages.

* cited by examiner

SUPERVISED ENVIRONMENT CONTROLLABLE AUTO-GENERATION OF HTML

BACKGROUND

The present invention relates generally to the field of web development, and more particularly to hypertext markup language generation.

Hypertext Markup Language (HTML) is the standard markup language for documents designed to be displayed in a web browser. HTML can be assisted by technologies such as Cascading Style Sheets (CSS) and scripting languages such as JavaScript. Web browsers receive HTML documents from a web server or from local storage and render the documents into multimedia web pages. HTML describes the structure of a web page semantically and originally included cues for the appearance of the document. HTML elements are the building blocks of HTML pages. With HTML constructs, images, and other objects such as interactive forms may be embedded into the rendered page. HTML provides a means to create structured documents by denoting structural semantics for text such as headings, paragraphs, lists, links, quotes, and other items. HTML elements are delineated by tags, written using angle brackets. Tags such as <img /> and <input /> directly introduce content into the page. Other tags such as <p> surround and provide information about document text and may include other tags as sub-elements. Browsers do not display the HTML tags but use them to interpret the content of the page. HTML can embed programs written in a scripting language such as JavaScript, which affects the behavior and content of web pages and inclusion of CSS defines the look and layout of content.

In common ANN implementations, the signal at a connection between artificial neurons is a real number, and the output of each artificial neuron is computed by some non-linear function of the sum of its inputs. The connections between artificial neurons are called 'edges'. Artificial neurons and edges typically have a weight that adjusts as learning proceeds. The weight increases or decreases the strength of the signal at a connection. Artificial neurons may have a threshold such that the signal is only sent if the aggregate signal crosses that threshold. Typically, artificial neurons are aggregated into layers. Different layers may perform different kinds of transformations on their inputs. Signals travel from the first layer (the input layer), to the last layer (the output layer), possibly after traversing the layers multiple times.

A recurrent neural network (RNN) is a class of ANN where connections between nodes form a directed graph along a sequence allowing the network to exhibit temporal dynamic behavior for a time sequence. Unlike feedforward neural networks, RNNs can use internal states (memory) to process sequences of inputs allowing the RNN to be applicable to tasks such as unsegmented connected handwriting recognition or speech recognition. Long short-term memory (LSTM) units are alternative layer units of a recurrent neural network (RNN). An RNN composed of LSTM units is referred as a LSTM network. A common LSTM unit is composed of a cell, input gate, output gate, and forget gate. The cell remembers values over arbitrary time intervals and the gates regulate the flow of information into and out of the cell. For an LSTM, the learning rate followed by the network size are the most crucial hyperparameters.

SUMMARY

Embodiments of the present invention disclose a computer-implemented method, a computer program product, and a system for generating web code based on a plurality of content and design controls. The computer-implemented method includes one or more computer processors creating a training set of crawled conforming webpages, wherein each crawled conforming webpage in the training set of crawled conforming webpages includes associated web code labeled a combination of respective one or more content controls and respective one or more design controls. The one or more computer processors encode the combination of the respective one or more design controls and the respective one or more content controls based on one or more user preferences utilizing a created design encoder and a created content encoder. The one or more computer processors create a decoder with the training set of crawled conforming webpages and associated encoded content and design vectors. The one or more computer processors generate web code based on the encoded design and content controls utilizing the created decoder. The one or more computer processors implement generated web code.

DETAILED DESCRIPTION

Automatic conversion of documents (presented in various formats) to HTML pages, that can be rendered in the form of websites, has been a continuing problem for web developers and users. However, no solution exists for generating a plurality of different variants of websites with varying content and styles from a document. Different variants of the website may be needed for a plurality of situational needs based on content requirements (what to present) and design choices (how to present). For example, a variant of a website meant for children may have content associated with increased readability as opposed to content shown to a domain expert. Similarly, a variant of a website will follow a different design for a visually impaired user than for a general audience.

Embodiments of the present invention identify environmental controls, defined by a user at runtime, that are imposed on a produced output. Embodiments of the present invention allow for generalizability, wherein the invention can be trained for any finite set of styles, audience, and content parameters, extendible to new situations. Embodiments of the present invention allow for a user to specify various controls to produce variants of the websites that can be deployed separately. In another embodiment of the present invention, a user while logging into a website, directly or indirectly specifies a plurality of controls, and corresponding web pages are dynamically generated and rendered. Embodiments of the present invention recognize that system efficiency is increased through the dynamic generation of web code. In this embodiment, system requirements are reduced due to a reduction of memory and storage requirements by generating web code variants on-the-fly instead of storing every variant statically. Embodiments of the present invention converts raw documents into web code variants. Implementation of embodiments of the invention may take a variety of forms, and exemplary implementation details are discussed subsequently with reference to the Figures.

The present invention will now be described in detail with reference to the Figures.

Figure 1:
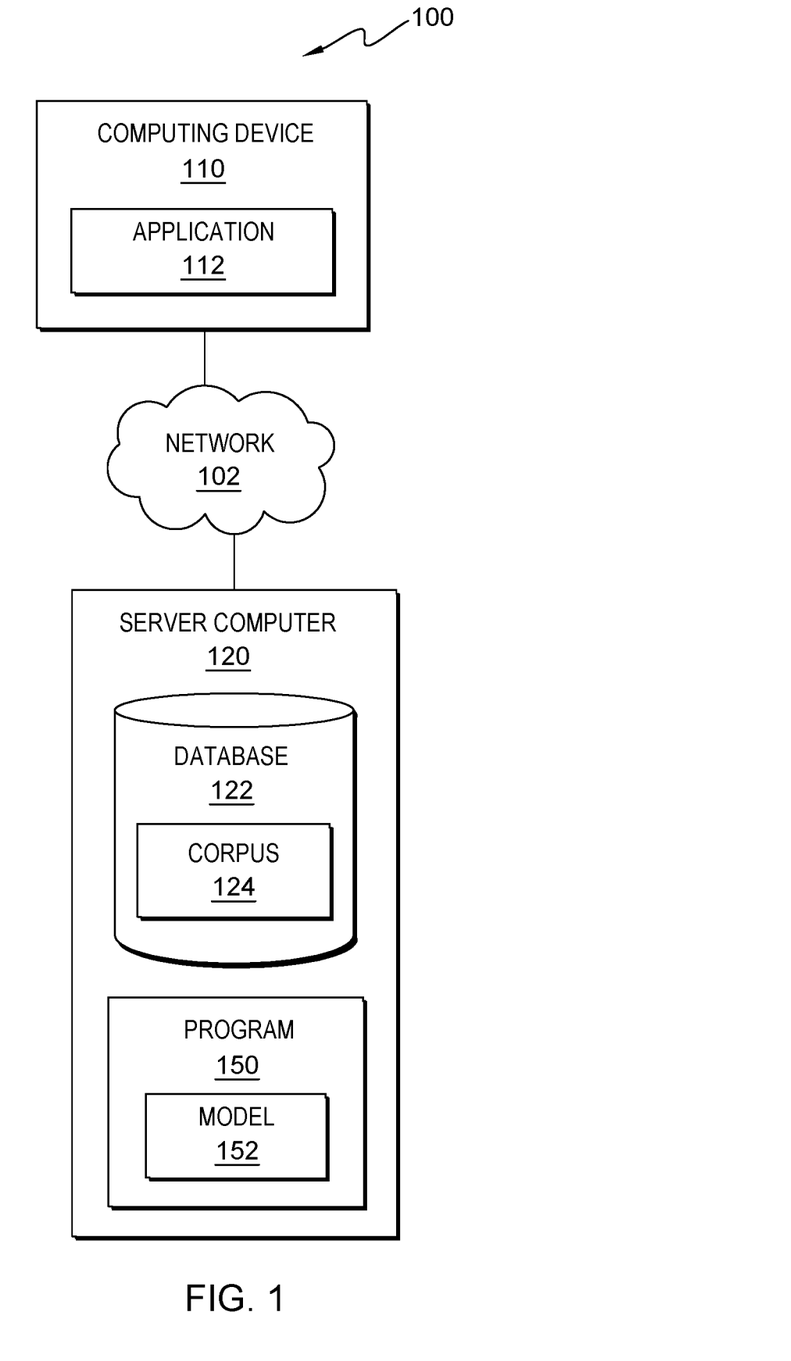
FIG. 1 is a functional block diagram illustrating a computational environment, in accordance with an embodiment of the present invention.

FIG. 1 is a functional block diagram illustrating a computational environment, generally designated 100, in accordance with one embodiment of the present invention. The term "computational" as used in this specification describes a computer system that includes multiple, physically, distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Computational environment 100 includes computing device 110 and server computer 120, interconnected over network 102. Network 102 can be, for example, a telecommunications network, a local area network (LAN), a wide area network (WAN), such as the Internet, or a combination of the three, and can include wired, wireless, or fiber optic connections. Network 102 can include one or more wired and/or wireless networks that are capable of receiving and transmitting data, voice, and/or video signals, including multimedia signals that include voice, data, and video information. In general, network 102 can be any combination of connections and protocols that will support communications between computing device 110, server computer 120, and other computing devices (not shown) within computational environment 100. In various embodiments, network 102 operates locally via wired, wireless, or optical connections and can be any combination of connections and protocols (e.g., personal area network (PAN), near field communication (NFC), laser, infrared, ultrasonic, etc.).

Computing device 110 may be any electronic device or computing system capable of processing program instructions and receiving and sending data. In some embodiments, computing device 110 may be a laptop computer, a tablet computer, a netbook computer, a personal computer (PC), a desktop computer, a personal digital assistant (PDA), a smart phone, or any programmable electronic device capable of communicating with network 102. In other embodiments, computing device 110 may represent a server computing system utilizing multiple computers as a server system, such as in a cloud computing environment. In general, computing device 110 is representative of any electronic device or combination of electronic devices capable of executing machine readable program instructions as described in greater detail with regard to FIG. 4, in accordance with embodiments of the present invention. In the depicted embodiment, computing device 110 contains application 112.

Application 112 is a set of one or more programs designed to carry out the operations for a specific application to assist a user to perform an activity (e.g., word processing programs, spread sheet programs, media players, web browsers). In the depicted embodiment, application 112 contains any software application utilized for accessing information on the World Wide Web. In this embodiment, when a user opens a web site, application 112 retrieves the necessary content from a web server then displays the resulting web page on computing device 110. In the depicted embodiment, application 112 resides on computing device 110. In another embodiment, application 112 may reside on server computer 120 or on another device (not shown) connected over network 102.

Server computer 120 can be a standalone computing device, a management server, a web server, a mobile computing device, or any other electronic device or computing system capable of receiving, sending, and processing data. In other embodiments, server computer 120 can represent a server computing system utilizing multiple computers as a server system, such as in a cloud computing environment. In another embodiment, server computer 120 can be a laptop computer, a tablet computer, a netbook computer, a personal computer (PC), a desktop computer, a personal digital assistant (PDA), a smart phone, or any programmable electronic device capable of communicating with computing device 110 and other computing devices (not shown) within computational environment 100 via network 102. In another embodiment, server computer 120 represents a computing system utilizing clustered computers and components (e.g., database server computers, application server computers, etc.) that act as a single pool of seamless resources when accessed within computational environment 100. In the depicted embodiment, server computer 120 includes database 122 and program 150. In other embodiments, server computer 120 may contain other applications, databases, programs, etc. which have not been depicted in computational environment 100. Server computer 120 may include internal and external hardware components, as depicted, and described in further detail with respect to FIG. 4.

Database 122 is a repository for data used by program 150. In the depicted embodiment, database 122 resides on server computer 120. In another embodiment, database 122 may reside on computing device 110 or elsewhere within computational environment 100 provided program 150 has access to database 122. A database is an organized collection of data. Database 122 can be implemented with any type of storage device capable of storing data and configuration files that can be accessed and utilized by program 150, such as a database server, a hard disk drive, or a flash memory. In an embodiment, database 122 stores data used by program 150, such as model fitness values including, but not limited to, predictive accuracy (e.g., Brier scores, Gini coefficients, discordant ratios, C-statistic values, net reclassification improvement indexes, generalized discrimination measures, etc.), error rates (e.g., root mean squared error (RMSE), mean absolute error, mean absolute percentage error, mean percentage error, etc.), precision, and related environment/system/server statistics (e.g., memory utilization, CPU utilization, storage utilization, etc.). In the depicted embodiment, program 150 contains corpus 124.

Corpus 124 contains one or more examples, sets of training data, data structures, and/or variables used to fit the parameters of a specified model. In an embodiment, the contained training data comprises of pairs of input vectors (encoded control (e.g., content and design) parameters) with associated output vectors (generated HTML). In an embodiment, corpus 124 may contain one or more sets of one or more instances of unclassified or classified (e.g., labelled) data, hereinafter referred to as training statements. In another embodiment, training data contains an array of training statements organized in labelled training sets. In an embodiment, each training set includes a label and an associated array or set of training statements which can be utilized to train one or more models. For example, a plurality of training sets may include training statements containing websites comprising web code (HTML, CSS, JavaScript, etc.) as paired with associated control parameters (design and content controls) labels. In an embodiment, corpus 124 contains unprocessed training data. In various embodiments, corpus 124 contains vectorized (i.e., one-hot encoding, word embedded, dimension reduced, etc.) training sets, associated training statements, and labels. In another embodiment, corpus 124 contains a design corpus and a content corpus, each containing training statements for design elements (e.g., typographic aspects (e.g., font size, font color, font, line height, line length, etc.), image aspects (e.g., image size, color combinations, contrast, etc.) and content elements (e.g., readability (vocabulary, syntax, etc.), text, images, tables, charts, graphs, sensitive words, etc.), respectively.

Models 152 utilizes a plurality of deep learning techniques to learn a plurality of stylistic and content variations of a website. In another embodiment, models 152 contains transferrable neural networks algorithms and models (e.g., neural network, RNNs, long short-term memory (LSTM), deep stacking network (DSN), deep belief network (DBN), CNNs, correlational models, etc.) that can be trained with weakly supervised methods. Models 152 contain a plurality of encoders and decoders. In an embodiment, program 150 creates, trains, and maintains a design encoder and a content (e.g., demographic) encoder outputting one or more encoded vectors. In the depicted embodiment, said encoders are convolutional neural networks and/or recurrent neural networks (RNN). In another embodiment, models 152 contains one or more decoders capable of generating web code (e.g., HTML, CSS, JavaScript, etc.). In an embodiment, program 150 inputs content, design, and demographic specifications into one or more decoders contained in models 152.

The models contained within models 152, once trained, can generate web code based on raw documents and controls identified, aggregated, and fed by program 150. In the depicted embodiment, the one or more decoders are RNNs. In various embodiments, models 152 contains a plurality of appropriateness scorers such as a design appropriateness scorer and content appropriateness scorer, respectively, capable of calculating a plurality of model losses utilized to modify and retrain one or more models contained within models 152. In an embodiment, the scorers output a conformity score representing an extent that generated web code conforms to one or more design and content controls. In the depicted embodiment, the scorers are correlational neural networks. The training of models 152 is depicted and described in further detail with respect to FIG. 2.

Program 150 is a program for generating web code based on a plurality of content and design controls. In the depicted embodiment, program 150 is a standalone software program. In another embodiment, the functionality of program 150, or any combination programs thereof, may be integrated into a single software program. In some embodiments, program 150 may be located on separate computing devices (not depicted) but can still communicate over network 102. In various embodiments, client versions of program 150 resides on computing device 110 and/or any other computing device (not depicted) within computational environment 100. Program 150 is depicted and described in further detail with respect to FIG. 2.

The present invention may contain various accessible data sources, such as database 122, that may include personal storage devices, data, content, or information the user wishes not to be processed. Processing refers to any, automated or unautomated, operation or set of operations such as collection, recording, organization, structuring, storage, adaptation, alteration, retrieval, consultation, use, disclosure by transmission, dissemination, or otherwise making available, combination, restriction, erasure, or destruction performed on personal data. Program 150 provides informed consent, with notice of the collection of personal data, allowing the user to opt in or opt out of processing personal data. Consent can take several forms. Opt-in consent can impose on the user to take an affirmative action before the personal data is processed. Alternatively, opt-out consent can impose on the user to take an affirmative action to prevent the processing of personal data before the data is processed. Program 150 enables the authorized and secure processing of user information, such as tracking information, as well as personal data, such as personally identifying information or sensitive personal information. Program 150 provides information regarding the personal data and the nature (e.g., type, scope, purpose, duration, etc.) of the processing. Program 150 provides the user with copies of stored personal data. Program 150 allows the correction or completion of incorrect or incomplete personal data. Program 150 allows the immediate deletion of personal data.

In various embodiments, the term "web code" should be construed having a broad meaning and should include all types of programmatic code. Non-limiting examples of web code include: HTML, CSS, JavaScript, text files, documents, and a plurality of server-side code such as PHP, python, etc. In another embodiments, web code refers to a webpage either in un-rendered or rendered form. In various embodiments, the term "HTML" should be construed having a broad meaning and should include all types of web code, as described above.

Figure 2:
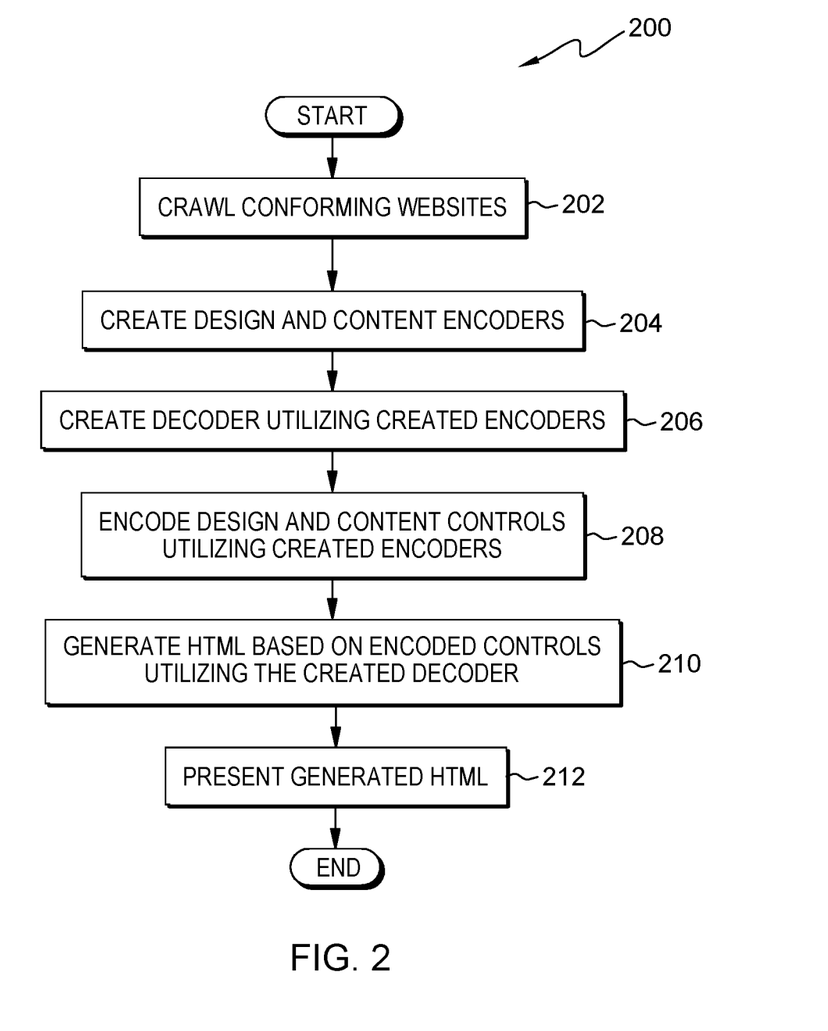
FIG. 2 is a flowchart depicting operational steps of a program, on a server computer within the computational environment of FIG. 1, for generating web code based on a plurality of content and design controls, in accordance with an embodiment of the present invention.

FIG. 2 is a flowchart depicting operational steps of program 150 for generating web code based on a plurality of content and design controls, in accordance with an embodiment of the present invention.

Program 150 crawls conforming website (step 202). In an embodiment, program 150 initiates in response to a web request utilizing a web browser (e.g., application 112). In another embodiment, program 150 initiates in response to a provided uniform resource link (URL) or raw document (e.g., text file, document, un-stylized HTML document, etc.). In an embodiment, program 150 receives, retrieves, or determines one or more hyperlinks to one or more websites that contain one or more design elements and one or more content elements that conform with a plurality of controls (design and content parameters). In an embodiment, program 150 utilizes one or more web-crawlers processing a set of URLs to visit. In this embodiment, as a web-crawler visits said URLs contained in the URLs to visit set, program 150 identifies all hyperlinks contained in one or more webpages, recursively adding the identified URLs to the set of URLs to visit. The web-crawler copies and saves each visited webpage (e.g., associated web code and labels). In an embodiment, program 150 maintains a snapshot of each visited page. Program 150 abides by a plurality of procedures for web-crawling as dictated by a website and an associated robots.txt file. For example, a robots.txt file can request web-crawlers to retrieve (e.g., index.) only specific sections of a website, or nothing at all.

Program 150 attaches one or more conforming design and/or content as labels to one or more crawled webpages (e.g., decomposed web code). For example, a web-crawler, utilized by program 150, crawls a set of news webpages for content elements regarding contemporary topics and design elements containing visual aid design principles. In an embodiment, program 150 creates training sets containing sections of crawled web code decomposed into composite content (e.g., elements pertaining to topics, sections of raw text, etc.) and design elements (e.g., elements pertaining to visual components, etc.) associated as labels. In various embodiments, program 150 creates a set of crawled conforming webpages where each crawled conforming webpage includes one or more content elements, and one or more design elements labelled with associated web code. Program 150 extracts various components from the crawled website, yielding a dataset containing instances of sets and/or vectors, for example <control, design label, content label, web code>. In various embodiment, program 150 creates one or more training sets from the crawled webpages.

Program 150 creates a design encoder and a content encoder (step 204). Program 150 creates and trains one or more models (encoders, scorers, decoders) contained within models 152 by feeding one or more labelled vectors. In an embodiment, program 150 initializes models 152 (e.g., design encoders, content encoders, decoder, scorers) with randomly generated weights. In yet another embodiment, program 150 performs supervised training with labeled vectorized data contained within corpus 124. For example, program 150 feeds web code and encoded controls, allowing program 150 to make inferences between web code and controls (design and content parameters). Program 150 utilizes processed training sets to perform supervised training of one or more model contained within models 152. In an embodiment, program 150 trains said models with a plurality of feature vectors originating from control parameters extracted from historical crawled conforming websites stored within corpus 124. In various embodiments, supervised training determines the difference between a prediction and a target (i.e., the error), and back-propagates the difference through the layers such that models 152 "learns". In an embodiment, program 150 utilizes stochastic gradient algorithms to implement backpropagation. In various embodiment, program 150 utilizes losses calculated by a plurality of design appropriateness scorers and content appropriateness scorers. In an embodiment, program 150 utilizes generation loss that captures how different generated web code is from reference web code. Here, the generation loss function utilizes categorical cross entropy. In another embodiment, program 150 utilizes content specific loss capturing the extent that generated web code has been adjusted based on content (e.g., demographic) controls and requirements. In this embodiment, the content specific loss is generated by a trained content appropriateness scorer. In yet another embodiment, program 150 utilizes design specific loss capturing the extent that generated web code has been adjusted based on design controls and requirements. In this embodiment, the design specific loss is generated by a trained design appropriateness scorer.

Program 150 creates and trains a design encoder and a content encoder utilizing the crawled websites and associated labels as training data (e.g., design corpus and content corpus contained within corpus 124). In an embodiment, the design encoder and content encoder are recurrent neural networks and/or convolutional neural networks trained with unsupervised training methods. Program 150 creates and trains a design appropriateness scorer and a content appropriateness scorer. Responsive to program 150 completing (e.g., convergence, minimizing of losses, etc.) training of the aforementioned encoders and scorers, program 150 determines a fitness level for each encoder and scorers. If the encoders and scorers are not well trained, then program 150 returns to training. In an embodiment, program 150 adjusts corpus 124 and retrains the encoders and scorers.

Program 150 creates a decoder utilizing the created design and content encoders (step 206). Program 150 creates and trains a decoder utilizing supervised training methods, as described in step 206. Program 150 trains the decoder utilizing training sets containing encoded vectors and control parameters as labels. In an embodiment, program 150 inputs encoded design and content vectors, generated from design and content encoders, into a trained decoder, allowing program 150 to generate web code conforming to the encoded design and content vectors. In various embodiments, a trained decoder utilizes generation loss, as described in step 204.

Program 150 encodes design and content controls (step 208). In various embodiments, program 150 acts as an inline proxy and/or a transparent proxy 'sitting' in between a computing device and the destination repository. In this embodiment, all network traffic to and from computing device 110 will travel through program 150. In another embodiment, program 150 monitors application 112 (e.g., browser) activity to determine a network transfer (e.g., hypertext transfer protocol (HTTP requests, etc.)). In an embodiment, program 150 identifies a HTTP request and pauses, delays, suspends, or halts the request until program 150 generates web code, as detailed below in step 210. In various embodiments, program 150 replaces and/or substitutes a graphical transmission icon within a user interface (not depicted). For example, browser applications (e.g., application 112) have graphical icons that when activated transmit a web request (e.g., network request). In this example, program 150 replaces one or more icons, with the respective triggers, to intercept and retain the URL before transmission. In yet another embodiment, program 150 may analyze outbound traffic of client computing device 110 to detect a transmission of a web request. In this embodiment, program 150 may retain the request until the associated web code is analyzed. In yet another embodiment, program 150 detects a URL by detecting a user entering words in application 112. In an embodiment, program 150 receives a requested URL and crawls one or more associated webpages, analyzes the crawled webpage, and decomposes the webpage into one or more web code components (e.g., text, images, charts, HTML, CSS, JavaScript, etc.).

In various embodiments, program 150 retrieves one or more user preferences dictating preferred and required design and content controls. For example, a user may have color sensitivity preferences, thus program 150 adjusts one or more design controls to conform with the color sensitivity preferences of the user. In an embodiment, user preferences are associated with a user system, browser, profiles, and/or any other applications. For example, when a user visits a web page, program 150 retrieves one or more user preferences associated with one or more design and content controls. Program 150 retrieves and/or receives targeted design and content considerations and encodes said considerations, utilizing the trained design and content encoders, as encoded control vectors. In various embodiments, program 150 utilizes encoded control vectors as distributed representations of web code and text that conforms with one or more design and content labels. In an embodiment, program 150 determines one or more user characteristics (e.g., demographic information (e.g., age, gender, profession, knowledge level, etc.), visualizations concerns (e.g., limited vision, hearing, etc.)) to determine appropriate content controls. In another embodiment, a webpage contains one or more default design and content controls.

Program 150 generates HTML based on encoded controls utilizing the created decoder (step 210). In an embodiment, program 150 generates conforming web code based on encoded design and content controls utilizing trained design and content encoders. Program 150 utilizes the trained decoder, as described in step 206, to output one or more sequences of web code based on one or more inputted encoded design and content control vectors. Program 150 utilizes the trained decoder and the learned weights and layers to predict and generate web code in a sequence given a target sequence (web code, design and content encoded controls). In one embodiment, utilizing the output of a decoder, program 150 generates a series of terms (web code) and associated probabilities. Said probabilities denote the chance that a generated term is a correct next term in a sequence. In an embodiment, program 150 utilizes a softmax layer in order to normalize the input vector (e.g., one-hot encoded and vectorized inputs, etc.) of K real numbers into a probability distribution consisting of K probabilities. In this embodiment, the softmax layer converts the output vector (e.g., predicted sequence) into a probability contained in the interval (0, 1), for example 0.58 or 58%. In an embodiment, program 150 selects the most probable web code (e.g., the web code with the highest attached probability). In another embodiment, program 150 prompts the user with the top generated webpage variant (e.g., assembled and rendered web code) and allows a user to select most conforming variant. In a further embodiment, program 150 prompts the user if no generated web code meets a predetermined probability threshold. For example, if a probability threshold is set at a 50% and no generated web code has a probability greater than 50%, then program 150 prompts the user with a list of variant webpages. In yet another embodiment, responsive to the generation of web code, program 150 appends the generated web code to the end of the sequence of web code and feeds the new sequence into the decoder for the generation of subsequent web code. In various embodiments, program 150 halts feeding sequences and vectors into a decoder if the probability of all generated web code falls under a predetermined probability threshold level, for example 50%. In said embodiments, program 150 utilizes design and content appropriateness scorers to generate one or more conformity probabilities and related scores (e.g., conformity score). In an embodiment, program 150 retrains one or more models contained in models 152 if one or more scores are insufficient (e.g., below a determined threshold (e.g., score or probability), etc.).

Program 150 utilizes a trained decoder to adjust one or more decomposed web code components (e.g., elements) to create conforming web code based on one or more encoded controls (e.g., design and content). In a further embodiment, program 150 utilizes a decoder to generate conforming web code by adjusting crawled webpages. In this embodiment, program 150 may adjust one or more elements to provide text alternatives for any non-text content convertible to alternative presentation methods such as large print, braille, speech, or symbols, provide alternatives for time-based media, avoiding elements known to cause seizures, adjusting text content to be more readable and understandable, adjust content to be presented in different ways (for example a simpler layout) without losing information or structure, adjusting web code to make it easier for users to see and hear content (for example separating foreground from background), creating keyboard functionality, providing users enough time to read and use content, providing methods to help users navigate, find content, and determine where they are (e.g., navigation controls), facilitate webpages to operate in predictable ways, and maximize compatibility with current and future user agents, including assistive technologies. For example, program 150 creates or adjusts a set of content controls that reduce a reading level of content on a web page. In this example, the control may adjust one or more terms to alternative terms that conform with a reading level of a user. In another embodiment, program 150 may increase content complexity when a user is an experienced reader or an expert in a related field. In another example, program 150 may generate, adjust, modify, transform, and/or present the appearance of a plurality of stylistic elements of web code (e.g., rendered website). In an embodiment, said plurality may include; adjustments to font, font size, character style (e.g., bold, italics, font color, background color, superscript, subscript, capitalization, etc.), general transparency, relative transparency, etc. For example, program 150, responsive to design control regulating seizure inducing colors, generates web code (specifically CSS code) that conforms to a set of "safe" colors.

Program 150 presents the generated HTML (step 210). In an embodiment, program 150 deploys generated web code to one or more webservers. In this embodiment, program 150 may maintain one or more generated variants of a website, each with separated web code specific to a variant. In another embodiment, program 150 maintains a plurality of generated variants, each sharing and building off a base, neutral webpage (e.g., web code stripped of any design elements). In various embodiments, program 150 modifies and presents (e.g., implements) existing web code. In an embodiment, program 150, dynamically, modifies displayed webpages based on generated web code. For example, program 150 may not have access to one or more webservers, thus program 150 receives web code transmitted to a user, via a browser, and dynamically adjusts and presents the modified webpage. In another embodiment, program 150 presents the generated web code on one or more web browsers. In various embodiments, program 150 adjusts existing web code utilizing the generated web code. Program 150 may output generated web code into a plurality of suitable formats such as text files, HTML files, CSS files, JavaScript files, documents, spreadsheets, etc. In yet another embodiment, program 150 adjusts all webpages rendered on application 112 (e.g., web browser). For example, every webpage, that a user visits, is dynamically adjusted to conform with one or more design and content controls dictated by the user.

Figure 3:
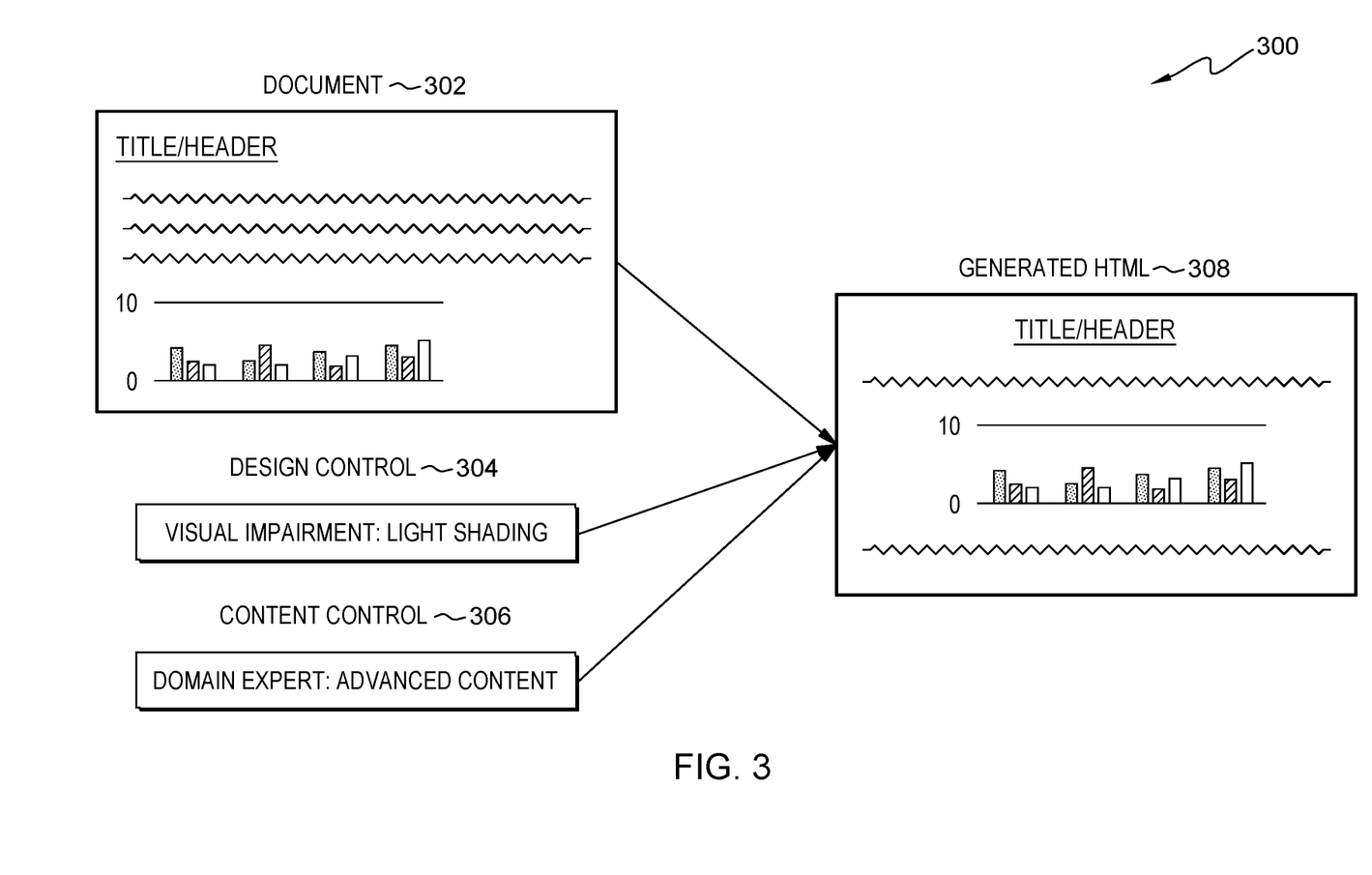
FIG. 3 illustrates operational steps of a program within the computational environment of FIG. 1, in accordance with an embodiment of the present invention.

FIG. 3 depicts example 300, which is an example generation of web code based on a plurality of controls, in accordance with an illustrative embodiment of the present invention. Example 300 includes document 302, a raw document or existing nonconforming web code, design control 304, a encoded vector of one or more user preferences controlling one or more design aspects, content control 306, an encoded vector of one or more user preferences controlling one or more content aspects, generated HTML 308, conforming web code generated by inputting document 302, design control 304, and content control 306 into a trained decoder.

Figure 4:
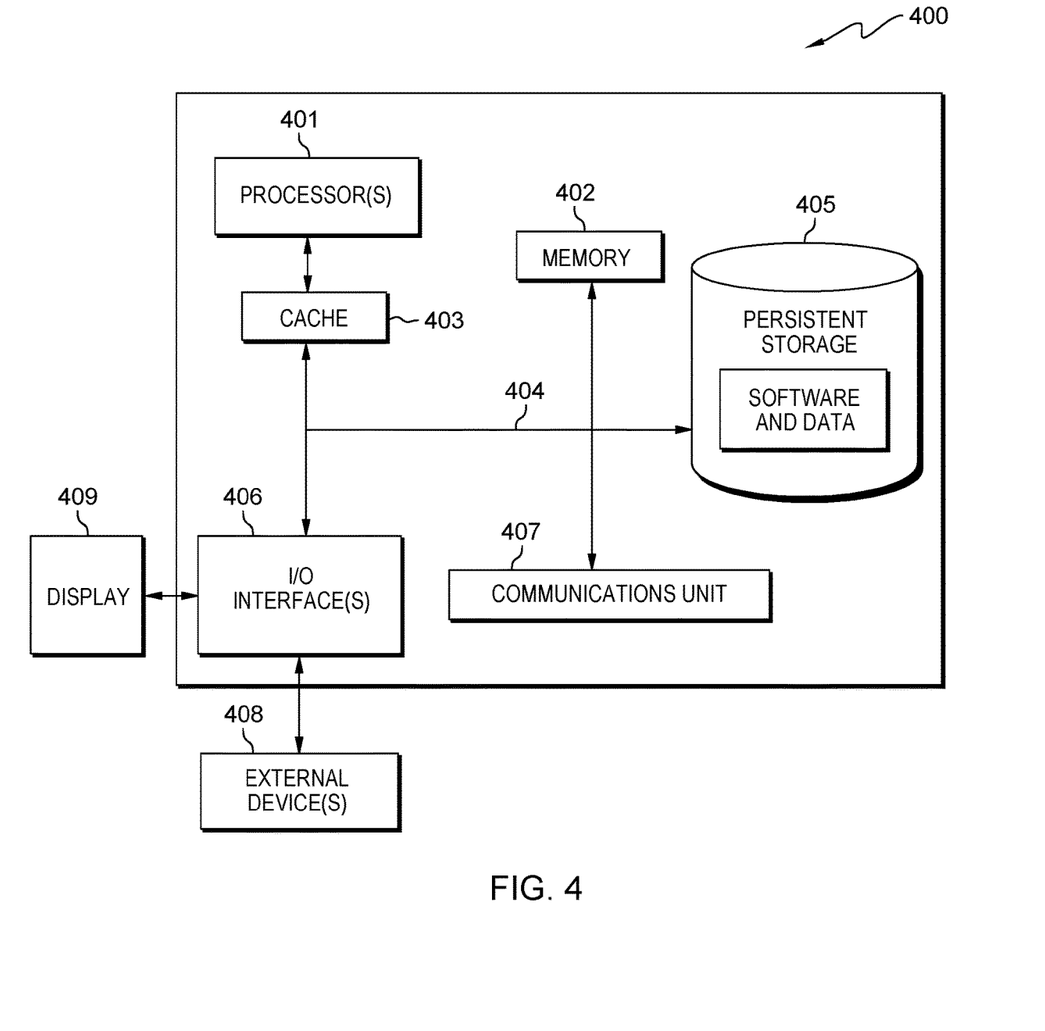
FIG. 4 is a block diagram of components of the computing device and server computer, in accordance with an embodiment of the present invention.

FIG. 4 depicts a block diagram of components of computing device 110 and server computer 120 in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

Computing device 110 and server computer 120 each include communications fabric 404, which provides communications between cache 403, memory 402, persistent storage 405, communications unit 407, and input/output (I/O) interface(s) 406. Communications fabric 404 can be implemented with any architecture designed for passing data and/or control information between processors (such as microprocessors, communications, and network processors, etc.), system memory, peripheral devices, and any other hardware components within a system. For example, communications fabric 404 can be implemented with one or more buses or a crossbar switch.

Memory 402 and persistent storage 405 are computer readable storage media. In this embodiment, memory 402 includes random access memory (RAM). In general, memory 402 can include any suitable volatile or non-volatile computer readable storage media. Cache 403 is a fast memory that enhances the performance of computer processor(s) 401 by holding recently accessed data, and data near accessed data, from memory 402.

Program 150 may be stored in persistent storage 405 and in memory 402 for execution by one or more of the respective computer processor(s) 401 via cache 403. In an embodiment, persistent storage 405 includes a magnetic hard disk drive. Alternatively, or in addition to a magnetic hard disk drive, persistent storage 405 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 405 may also be removable. For example, a removable hard drive may be used for persistent storage 405. Other examples include optical and magnetic disks, thumb drives, and smart cards that are inserted into a drive for transfer onto another computer readable storage medium that is also part of persistent storage 405.

Communications unit 407, in these examples, provides for communications with other data processing systems or devices. In these examples, communications unit 407 includes one or more network interface cards. Communications unit 407 may provide communications through the use of either or both physical and wireless communications links. Program 150 may be downloaded to persistent storage 405 through communications unit 407.

I/O interface(s) 406 allows for input and output of data with other devices that may be connected to computing device 110 and server computer 120. For example, I/O interface(s) 406 may provide a connection to external device(s) 408, such as a keyboard, a keypad, a touch screen, and/or some other suitable input device. External devices 408 can also include portable computer readable storage media such as, for example, thumb drives, portable optical or magnetic disks, and memory cards. Software and data used to practice embodiments of the present invention, e.g., program 150, can be stored on such portable computer readable storage media and can be loaded onto persistent storage 405 via I/O interface(s) 406. PO interface(s) 406 also connect to a display 409.

Display 409 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, conventional procedural programming languages, such as the "C" programming language or similar programming languages, and quantum programming languages such as the "Q" programming language, Q #, quantum computation language (QCL) or similar programming languages, low-level programming languages, such as the assembly language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
    responsive to a HTTP request from a user, decomposing, by one or more computer processors, a crawled webpage associated with the HTTP request into web code components;
    encoding, by one or more computer processors, one or more design controls and one or more content controls based on one or more user preferences associated with the user utilizing a created design encoder and a created content encoder, wherein the one or more design controls provide presentation alternatives for time-based media in the webpage and adjust elements known to cause seizures in the webpage, and wherein the one or more content controls provide content complexity adjustments in the webpage based on a knowledge level of the user;
    creating, by one or more computer processors, a decoder with a training set of crawled conforming webpages and associated encoded content and design vectors generated from the created design encoder and the created content encoder;
    adjusting, by one or more computer processors, the web code components to create conforming web code that conforms to the encoded content and design vectors based on the encoded design and content controls utilizing the created decoder; and
    presenting, by one or more computer processors, the conforming web code to the user.

2. The method of claim 1, further comprising: creating, by one or more computer processors, the training set of crawled conforming webpages, wherein each crawled conforming webpage in the training set of crawled conforming webpages includes associated web code labeled a combination of respective one or more content controls and respective one or more design controls.

3. The method of claim 1, further comprising:
    deploying, by one or more computer processors, the conforming web code to one or more webservers.

4. The method of claim 1, wherein creating the decoder with the training set of crawled conforming webpages and the associated encoded content and design vectors, comprises:
    calculating, by one or more computer processors, a design specific loss capturing an extent that the conforming web code has been adjusted based on design controls and requirements; and
    calculating, by one or more computer processors, a content specific loss capturing an extent that the conforming web code has been adjusted based on content controls and requirements.

5. The method of claim 1, wherein the created encoders are recurrent neural networks or convolutional neural networks trained with unsupervised training methods.

6. The method of claim 1, wherein the created decoder is a recurrent neural network.

7. A computer program product comprising:
one or more computer readable storage media and program instructions stored on the one or more computer readable storage media, the stored program instructions comprising:
program instructions to, responsive to a HTTP request from a user, decompose a crawled webpage associated with the HTTP request into web code components;
program instructions to encode one or more design controls and one or more content controls based on one or more user preferences associated with the user utilizing a created design encoder and a created content encoder, wherein the one or more design controls provide presentation alternatives for time-based media in the webpage and adjust elements known to cause seizures in the webpage, and wherein the one or more content controls provide content complexity adjustments in the webpage based on a knowledge level of the user;
program instructions to create a decoder with a training set of crawled conforming webpages and associated encoded content and design vectors generated from the created design encoder and the created content encoder;
program instructions to adjust the web code components to create conforming web code that conforms to the encoded content and design vectors based on the encoded design and content controls utilizing the created decoder; and
program instructions to resent the conforming web code to the user.

8. The computer program product of claim 7, wherein the program instructions on the one or more computer readable storage media, comprise:
program instructions to create the training set of crawled conforming webpages, wherein each crawled conforming webpage in the training set of crawled conforming webpages includes associated web code labeled with the combination of the respective one or more content controls and the respective one or more design controls.

9. The computer program product of claim 7, wherein the program instructions, stored on the one or more computer readable storage media, comprise: program instructions to deploy the conforming web code to one or more webservers.

10. The computer program product of claim 7, wherein the created encoders are recurrent neural networks or convolutional neural networks trained with unsupervised training methods.

11. The computer program product of claim 7, wherein the created decoder is a recurrent neural network.

12. A computer system comprising:
one or more computer processors;
one or more computer readable storage media; and program instructions stored on the computer readable storage media for execution by at least one of the one or more processors, the stored program instructions comprising:
program instructions to, responsive to a HTTP request from a user, decompose a crawled webpage associated with the HTTP request into web code components;
program instructions to encode one or more design controls and one or more content controls based on one or more user preferences associated with the user utilizing a created design encoder and a created content encoder, wherein the one or more design controls provide presentation alternatives for time-based media in the webpage and adjust elements known to cause seizures in the webpage, and wherein the one or more content controls provide content complexity adjustments in the webpage based on a knowledge level of the user;
program instructions to create a decoder with a training set of crawled conforming webpages and associated encoded content and design vectors generated from the created design encoder and the created content encoder;
program instructions to adjust the web code components to create conforming web code that conforms to the encoded content and design vectors based on the encoded design and content controls utilizing the created decoder; and
program instructions to present the conforming web code to the user.

13. The computer system of claim 12, wherein the program instructions, stored on the one or more computer readable storage media, comprise:
program instructions to create the training set of crawled conforming webpages, wherein each crawled conforming webpage in the training set of crawled conforming webpages includes associated web code labeled with the combination of the respective one or more content controls and the respective one or more design controls.

14. The computer system of claim 12, wherein the program instructions, stored on the one or more computer readable storage media, comprise: program instructions to deploy the conforming web code to one or more webservers.

15. The computer system of claim 12, wherein the created encoders are recurrent neural networks or convolutional neural networks trained with unsupervised training methods.

16. The computer system of claim 12, wherein the created decoder is a recurrent neural network.

17. The computer system of claim 12, wherein the program instructions, to create the decoder with the training set of crawled conforming webpages and the associated encoded content and design vectors, comprise: program instructions to calculate a design specific loss capturing an extent that the conforming web code has been adjusted based on design controls and requirements; and program instructions to calculate a content specific loss capturing an extent that the conforming web code has been adjusted based on content controls and requirements.

* * * * *